US008179313B1

(12) United States Patent
Azziz et al.

(10) Patent No.: US 8,179,313 B1
(45) Date of Patent: May 15, 2012

(54) ANTENNA TRACKING PROFILE ESTIMATION

(75) Inventors: Yassir Azziz, San Mateo, CA (US); Alicia Kavelaars, Berkeley, CA (US); Xen Price, Redwood City, CA (US); David Cielaszyk, Longmont, CO (US); Rob Schwarz, Los Gatos, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 141 days.

(21) Appl. No.: 12/779,872

(22) Filed: May 13, 2010

Related U.S. Application Data

(60) Provisional application No. 61/180,675, filed on May 22, 2009.

(51) Int. Cl.
*H01Q 3/00* (2006.01)
*H04B 7/185* (2006.01)

(52) U.S. Cl. ........................ 342/359; 342/354; 342/358

(58) Field of Classification Search .................. 342/358, 342/359, 354
See application file for complete search history.

(56) References Cited

U.S. PATENT DOCUMENTS 5,940,034 A 8/1999 Leung
6,720,918 B2 4/2004 Reckdahl et al.

*Primary Examiner* — Thomas Tarcza
*Assistant Examiner* — Cassie Galt
(74) *Attorney, Agent, or Firm* — Weaver Austin Villeneuve & Sampson LLP

(57) ABSTRACT

Estimation of a desired antenna tracking profile is provided for a radio frequency autotracked (RFAT) antenna in the absence of a ground reference. A first RFAT antenna subsystem has a first antenna and a first antenna positioning mechanism (APM), each mounted on a vehicle, and a first ground-based RF beacon; a second RFAT antenna subsystem has a second antenna and a second APM, each mounted on the vehicle, and a second ground-based RF beacon. A controller stores an accumulated record of actuations of the second APM as a function of time under normal operation, calculates a desired antenna tracking profile for the second antenna, from a first ground-based RF beacon and from the accumulated record, excluding any real-time data from the second ground-based RF beacon, and transmits actuation commands to the second APM so as to cause the second antenna to track the desired antenna tracking profile.

12 Claims, 5 Drawing Sheets

ANTENNA TRACKING PROFILE ESTIMATION

RELATED APPLICATIONS

The present patent application claims the priority benefit of commonly owned U.S. provisional patent application 61/180,675, filed May 22, 2009, entitled "Antenna Tracking Profile Estimation", which is hereby incorporated by reference in its entirety into the present patent application.

TECHNICAL FIELD

This invention relates generally to spacecraft communication systems, and, more particularly, to estimation of an antenna tracking profile for a radio frequency (RF) autotracked antenna in the absence of a ground reference.

BACKGROUND OF THE INVENTION

The assignee of the present invention manufactures and deploys spacecraft having multiple antennas for provision of communications and broadcast services. RF autotracking (RFAT) is a known method for steering individual antennas mounted to a spacecraft platform (or other vehicle) to compensate for pointing disturbances experienced by the vehicle and the antenna. As illustrated in FIG. 1, a conventional RFAT subsystem 100, consists of an antenna 110 and a positioning mechanism (APM) 120, each mounted on the vehicle, a ground-based RF beacon 150, and a controller (RF Autotrack Processor) 140. Controller 140 generates and transmits actuation commands to APM 120 so as to cause the antenna to remain in a desired pointing orientation with respect to the ground-based RF beacon 150. The controller 140 normally operates based on error information sensed by RF sensor 130. A vehicle may have several RFAT subsytems, each having a respective antenna, APM, ground beacon, and RF sensor. Furthermore, a pointing orientation of antenna 110 may be adjusted by steering the main reflector 111, the splash plate 112, or both.

Each RFAT subsystem 100 on a given vehicle generally uses a dedicated, respective, ground-based RF beacon 150 that provides a ground reference from a fixed location. Controller 140 senses errors in the apparent position of the ground-based RF beacon 150 and corrects for the errors by sending commands to APM 120 to return the antenna 110 to its optimal pointing orientation. An error to be corrected may result, for example, from pointing transients experienced by the vehicle, or from antenna-related factors, such as thermally-induced distortion.

Loss of signal from ground-based RF beacon 150, whether due to scheduled maintenance or an unplanned outage, degrades the pointing performance of RFAT subsystem 100. To mitigate this problem, redundancy in ground-based RF beacon 150 may be provided, but this results in substantial additional cost.

As disclosed by Reckdahl, et al., in U.S. Pat. No. 6,720,918 (hereinafter, "Reckdahl"), assigned to the assignee of the present invention, absence of a ground beacon in an RFAT antenna system may be partially mitigated by provision of a thermal distortion estimation system. The estimation system models the periodic thermal distortion profile of an antenna, using a generally repetitive diurnal profile, adjusted by a more slowly time-varying seasonal profile. The system described in Reckdahl does not correct for pointing errors resulting from vehicle transient disturbances such as those resulting from maneuvers or from Earth sensor radiance gradient effects.

SUMMARY OF INVENTION

The present inventors have recognized that an antenna tracking profile estimator may improve antenna pointing performance of an antenna affected by outage of a ground-based RF beacon. The profile estimator may provide a desired antenna tracking profile using historical pointing data of the affected antenna corrected by real time transient information calculated based on an unaffected antenna's stepping profile. The resulting antenna tracking profile may be used to drive the affected antenna, thereby maintaining improved pointing performance during an outage of the ground-based RF beacon.

The estimator may be used for short- or long-term outages. For example, if the ground-based RF beacon experiences a twenty four hour outage, the estimator may process a previous day's data of the affected antenna to provide a twenty four hour antenna tracking profile that the affected antenna can slew along. On the other hand, in order to reduce cost associated with maintaining a ground beacon, the estimator may, for example, generate a year-long desired antenna tracking profile for the affected antenna. The profile estimator may be implemented in a controller located either on the ground or on-board the spacecraft.

The antenna tracking profile estimator enables satisfactory pointing of an antenna in an RFAT subsystem affected by a beacon outage. The estimator calculates a desired antenna tracking profile for the affected antenna based on information from an unaffected RFAT subsystem, and from an accumulated record of actuations (i.e., step count) of the affected subsystem's APM as a function of time. The accumulated record results from normal operation of the affected RFAT subsystem. Thus, the affected RFAT subsystem is enabled to achieve substantially normal performance even in the absence of any real-time data from its ground-based RF beacon.

In an embodiment, a system provides estimation of a desired antenna tracking profile for an RFAT antenna in the absence of a ground reference. A first RFAT antenna subsystem has a first antenna and a first antenna positioning mechanism (APM), each mounted on a vehicle, and a first ground-based RF beacon; a second RFAT antenna subsystem has a second antenna and a second APM, each mounted on the vehicle, and a second ground-based RF beacon. A controller stores an accumulated record of actuations of the second APM as a function of time under normal operation, calculates a desired antenna tracking profile for the second antenna, from a first ground-based RF beacon and from the accumulated record, excluding any real-time data from the second ground-based RF beacon, and transmits actuation commands to the second APM so as to cause the second antenna to track the desired antenna tracking profile.

BRIEF DESCRIPTION OF THE DRAWINGS

Features of the invention are more fully disclosed in the following detailed description of the preferred embodiments, reference being had to the accompanying drawings, in which.

Figure 1:
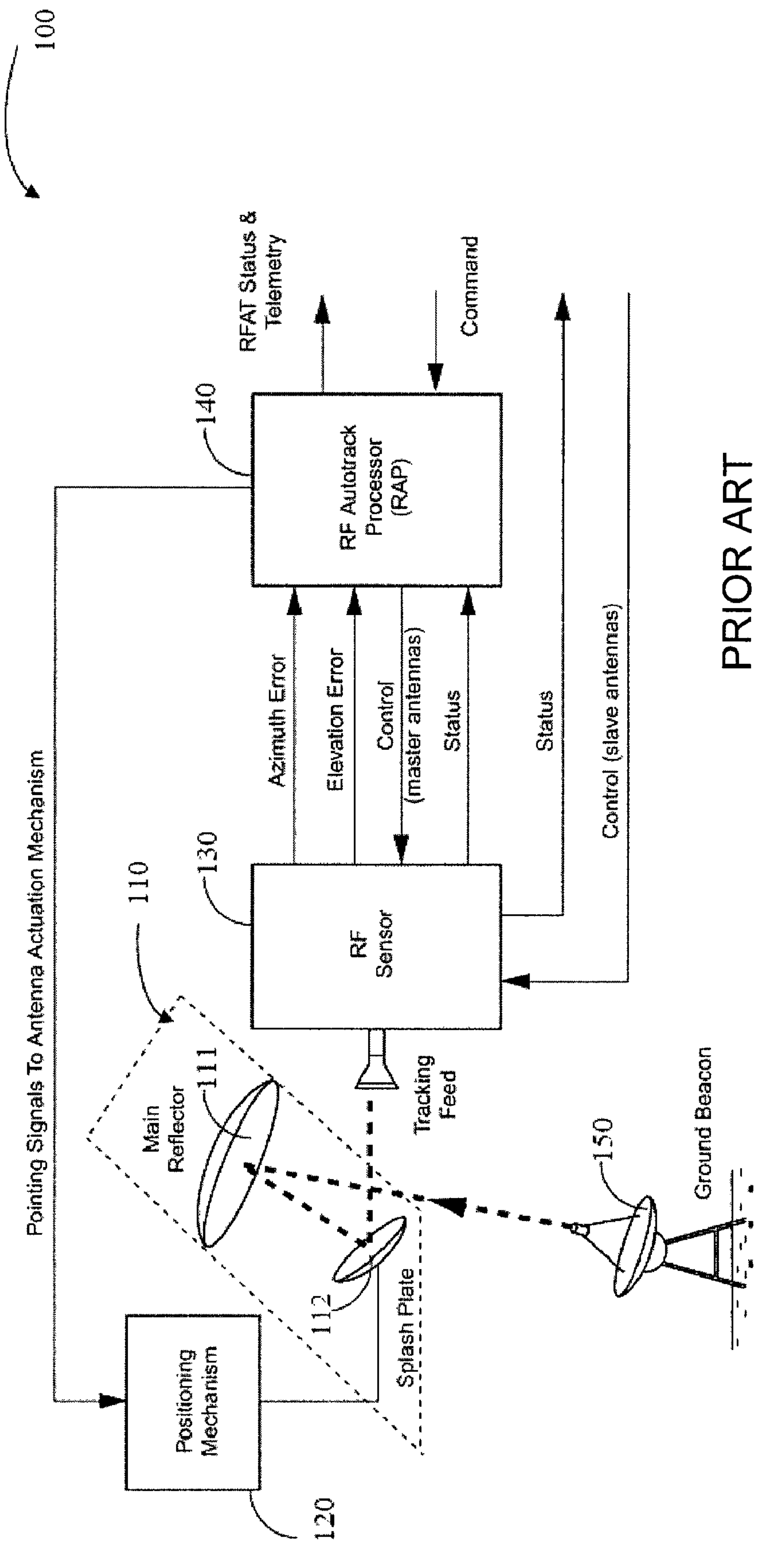
PRIOR ART FIG. 1
FIG. 1 illustrates an RFAT subsystem according to the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

Figure 2:
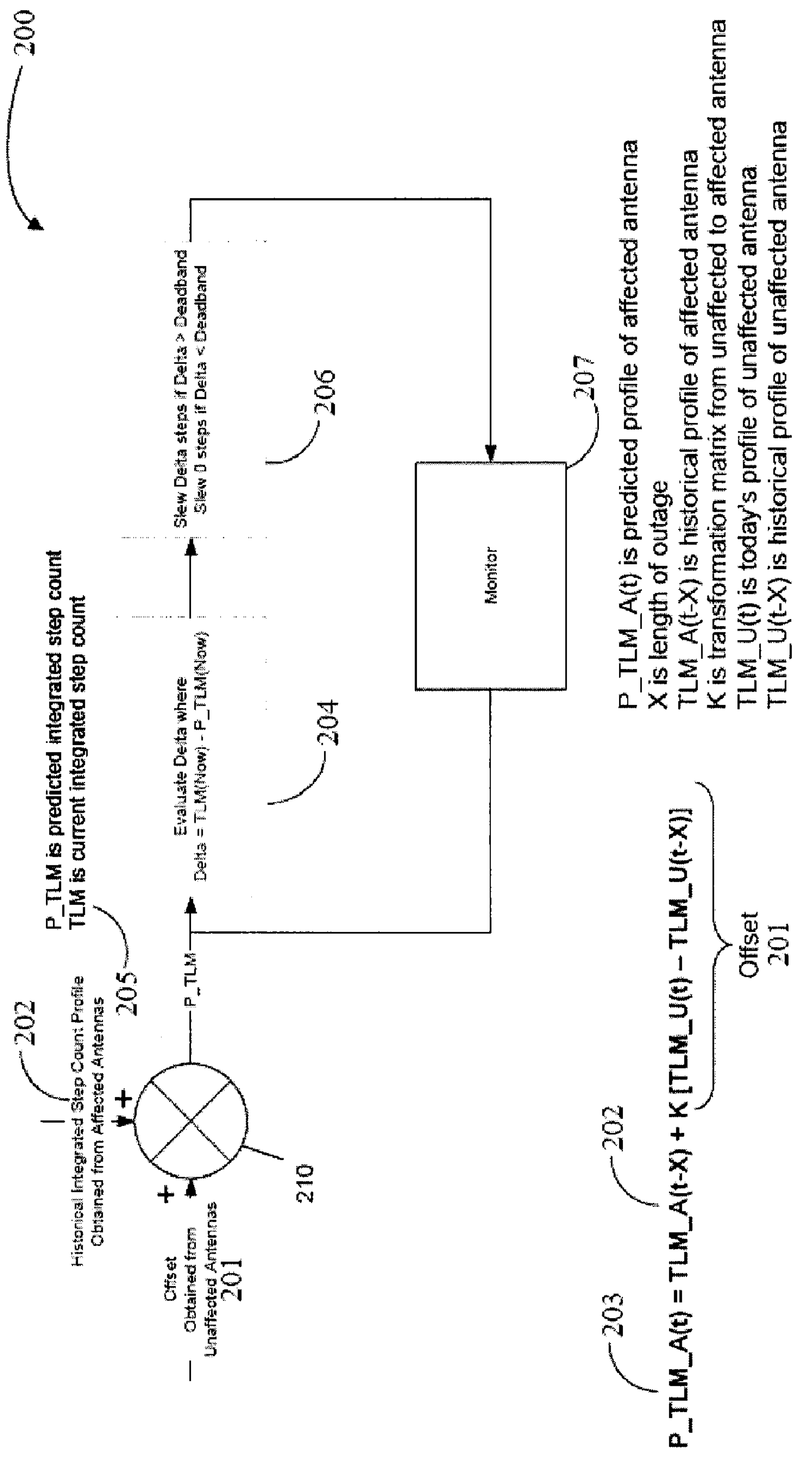
FIG. 2 illustrates an embodiment of a RFAT subsystem controller.

With reference to FIG. 2, in an exemplary embodiment, a controller 200 includes estimator 210 which may calculate a desired antenna tracking profile by combining real-time information from an unaffected RFAT subsystem (e.g., offset data 201) with an historical integrated step count profile, TLM_A(t-X) 202.

Step count profile TLM_A(t-X) 202 may consist of an accumulated record of actuations of the affected APM as a function of time, where the accumulated record results from normal operation (i.e., with the RF beacon active) of the affected RFAT subsystem for a particular epoch.

Offset data 201 may be expressed as K[TLM_U(t)-TLM_U(t-X)], where K is a transformation matrix from the unaffected antenna to the affected antenna, TLM_U(t) is a current profile of the antenna tracking profile of the unaffected antenna and TLM_U(t-X) is an historical antenna tracking profile of the unaffected antenna.

The estimator may output P_TLM_A(t) 203, representing a predicted antenna tracking profile for the affected antenna. P_TLM_A(t) 203 may represent the desired antenna pointing orientation at a moment in time, identified in terms of APM step count. The controller may compare, at block 204, P_TLM_A(t) 203 with an actual integrated step count TLM. When the "delta" between P_TLM 203 and TLM 205 exceeds a specified deadband, a signal generator within the controller may command, at block 206, an actuation of the affected RFAT subsystem's APM so as to cause the affected antenna to track the desired antenna tracking profile. For example, the actuation command may be to slew "delta" steps if delta exceeds the specified deadband.

In an embodiment, a monitoring operation 207 is performed whereby performance of the affected RFAT subsystem is specially monitored. This monitoring may include, for example, real-time or near real-time tracking of the slew commands to the affected RFAT subsystem's APM, or payload performance monitoring, for example by measuring actual effective isotropically radiated power.

Figure 3:
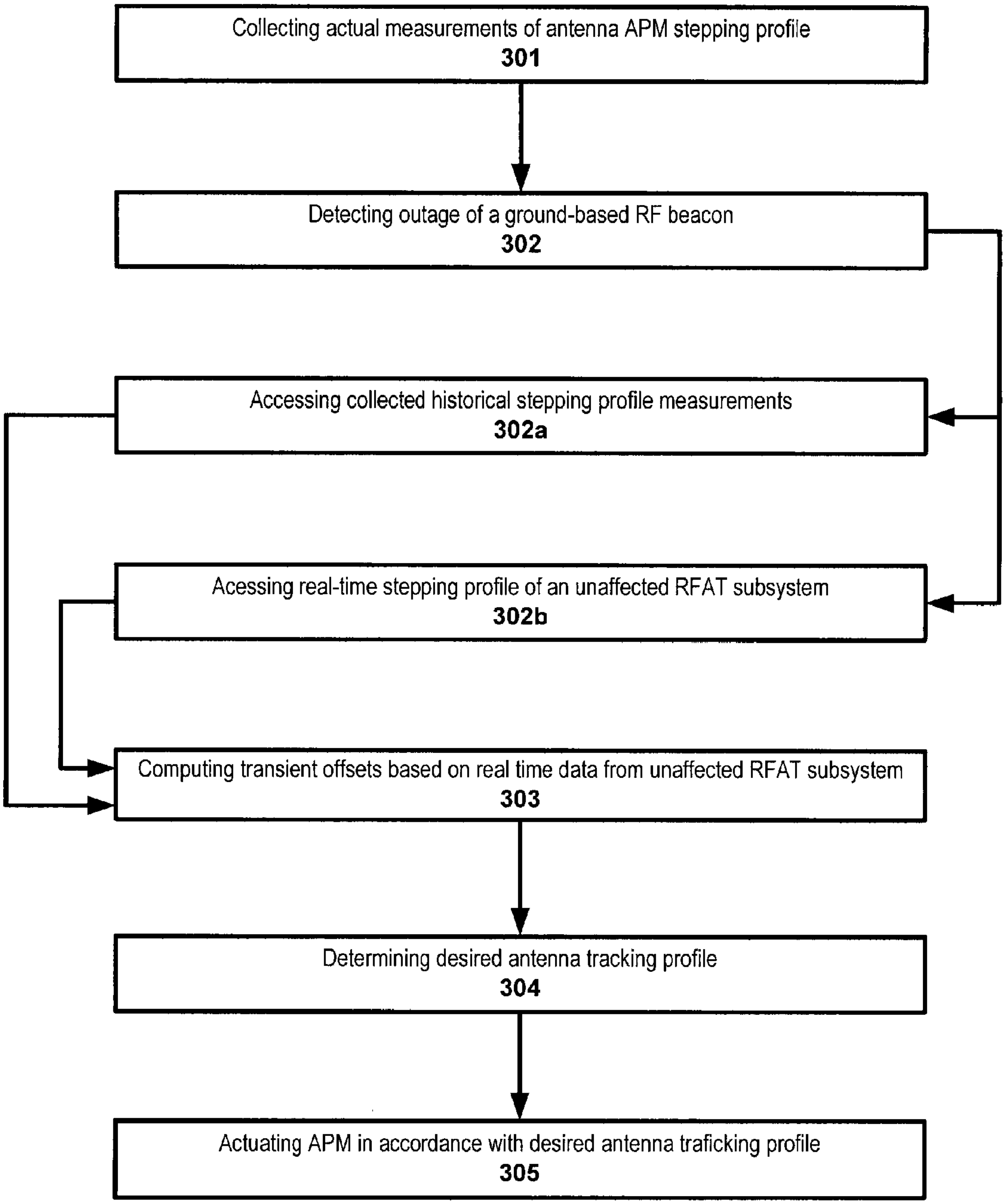
FIG. 3 illustrates a method for estimating an antenna tracking profile.
Figure 4:
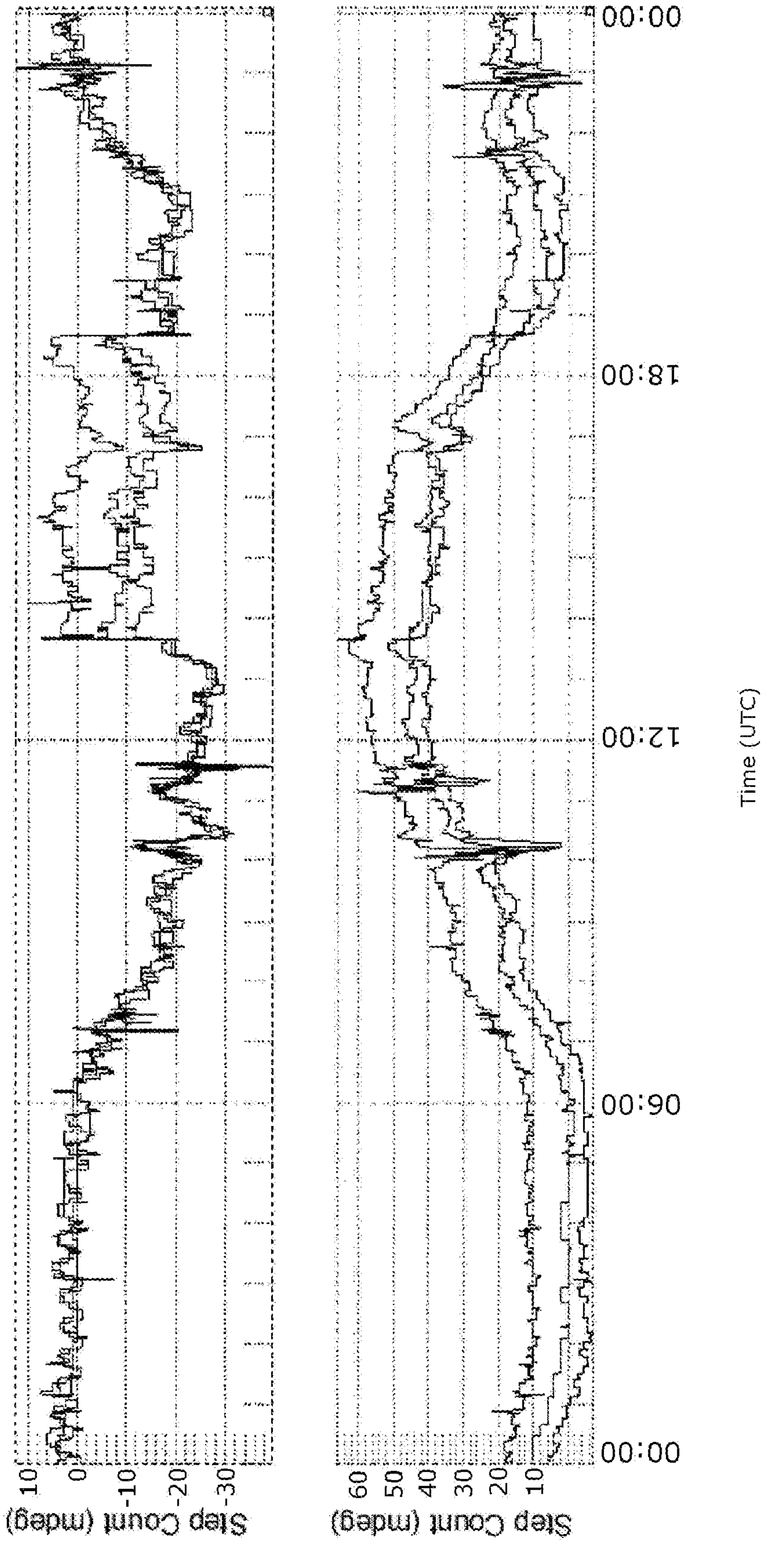
FIG. 4 illustrates APM step count as a function of time for an RFAT subsystem.
Figure 5A:
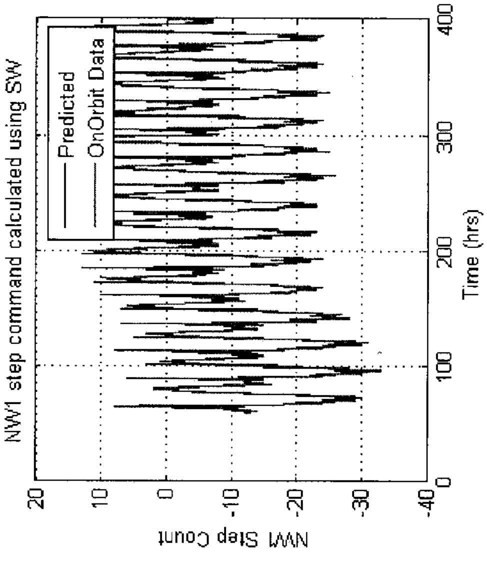
FIG. 5 illustrates exemplary performance results for an embodiment.
Figure 5B:
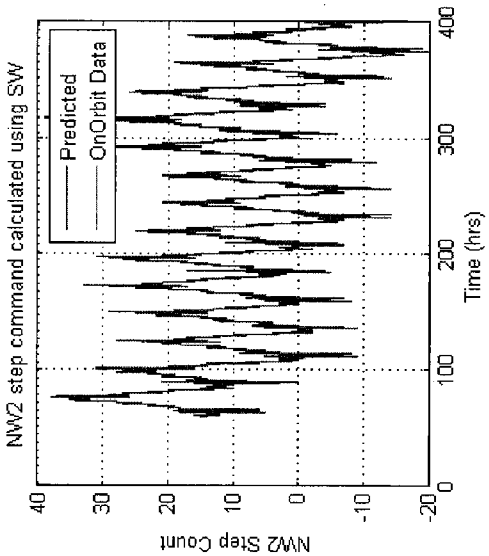
Figure 5C:
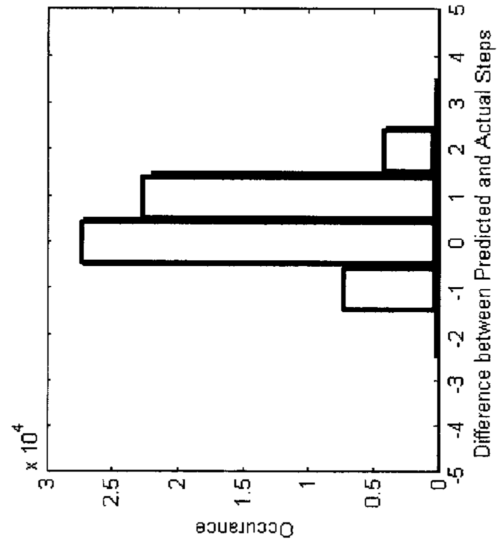
Figure 5D:
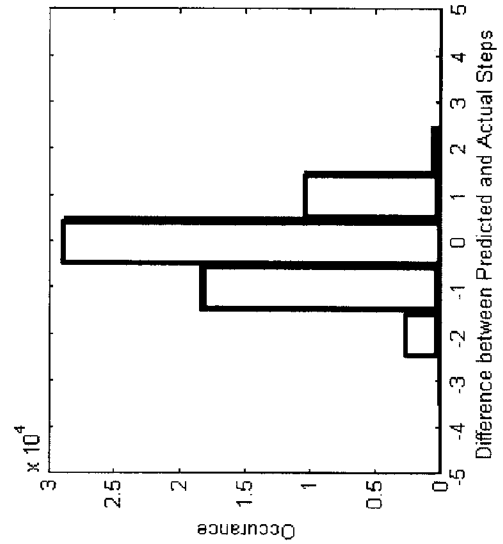

With reference to FIG. 3, in a second exemplary embodiment, actual measurements of an antenna APM stepping profile are collected, step 301. As an example, APM step count vs time, as presented in FIG. 4, may be collected. Advantageously, these may be stored in controller 140. Upon detecting an outage, step 302, the collected historical stepping profile measurements are accessed, step 302*a*, as well as the real-time stepping profile of an unaffected RFAT subsystem on the vehicle, step 302*b*. Advantageously, the historical data should be selected from a time frame with similar sun orientations on the spacecraft, i.e., 24 hours, 48 hours, or 1 year prior to the outage. Transient offsets based on real time data from the unaffected antenna RFAT subsystem are computed, step 303. The real time transient offsets computed in step 303 are applied to correct the historical stepping profile resulting in a desired antenna tracking profile, step 304. The desired antenna tracking profile is applied to the affected RFAT subsystem by transmitting actuation commands to the respective APM of the affected RFAT subsystem, step 305.

Thus, measurements from an antenna that has current data available are combined with historical data from an antenna that does not. Thereby, real-time vehicle transients common to each RFAT subsystem, such as those caused by an Earth sensor radiance gradient, are corrected while using antenna-specific historical data to correct for antenna-specific pointing deviations.

The above-described method may be applied automatically or manually. Automatic implementation may be accomplished by way of a controller located either on the ground or on the vehicle.

Referring now to FIG. 5, an antenna tracking profile with an RF autotrack beacon ("OnOrbit Data") is compared to a "Predicted" antenna tracking profile provided in accordance with an embodiment of the present invention. In the example illustrated by FIG. 5, OnOrbit Data is an actual antenna tracking profile (as represented by APM "step count"). FIG. 5A, for example, presents OnOrbit Data for a first axis of a northwest antenna (NW1) while FIG. 5B presents OnOrbit Data or a second axis of the northwest antenna (NW2). Overlaid on the actual antenna tracking profile, in each of FIGS. 5A and 5B, is the predicted antenna tracking profile for a situation in which the northwest antenna has been affected by an RFAT beacon outage. The predicted antenna tracking profile results from combining (i) an offset obtained from a southwest antenna that is unaffected by an RFAT beacon outage with (ii) historical data obtained for the northwest antenna. As illustrated in FIGS. 5C and 5D, a difference between OnOrbit Data and Predicted results, for this example, is never greater than three steps.

The antenna tracking estimator allows for uninterrupted payload service in the event of a beacon outage. In addition, for a vehicle already using at least two ground-based RF beacons, the estimator permits relaxation of a requirement for 100% availability of the beacons. With the estimator, the vehicle's payload performance is substantially unimpaired in the event of outage of a ground-based RF beacon, provided only that a single ground-based RF beacon remains operational. Thus, total system costs may be substantially reduced.

The antenna tracking profile estimator generates an antenna stepping command that is used to drive any antenna affected by a beacon outage. The corrected stepping profile provides a more accurate tracking profile than conventional schemes because it allows for real-time correction of pointing errors that are not correctable based only on previous days' data.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

The invention claimed is:

1. A system, comprising:

a first radio frequency (RF) autotracked antenna subsystem, said first subsystem comprising a first antenna and a first antenna positioning mechanism (APM), each mounted on a vehicle, and a first ground-based RF beacon;

a second RF autotracked antenna subsystem, said second subsystem comprising a second antenna and a second APM, each mounted on said vehicle, and a second ground-based RF beacon; and a controller, said controller comprising:

a memory to store historical data from an accumulated record of actuations of the second APM as a function of time, said accumulated record denoting normal operation of the second antenna, the second APM, and the second ground-based RF beacon, an estimator to calculate a desired antenna tracking profile for the second antenna, during occurrence of an outage of the second ground-based RF beacon, by combining real-time information received from the first RF autotracked antenna subsystem with at least a portion of the historical data, and a signal generator to transmit actuation commands to the second APM so as to cause the second antenna to track the desired antenna tracking profile.

2. An apparatus, comprising:

a controller, communicatively coupled to a first RF autotracked antenna subsystem and to a second, RF autotracked antenna subsystem, said first subsystem comprising a first antenna and a first antenna positioning mechanism (APM), each mounted on a vehicle, and a first ground-based RF beacon, said second subsystem comprising a second antenna and a second APM, each mounted on said vehicle, and a second ground-based RF beacon, said controller comprising:

a memory to store an accumulated record of actuations of the second APM as a function of time, said accumulated record denoting normal operation of the second antenna, the second APM, and the second ground-based RF beacon, an estimator to calculate a desired antenna tracking profile for the second antenna, during occurrence of an outage of the second ground-based RF beacon, by combining real-time information received from the first RF autotracked antenna subsystem with at least a portion of the historical data, and a signal generator to transmit actuation commands to the second APM so as to cause the second antenna to track the desired antenna tracking profile.

3. A method, comprising:

operating a first and second RF autotracked antenna subsystem, said first subsystem comprising a first antenna and a first antenna positioning mechanism (APM), each mounted on a vehicle, and a first ground-based RF beacon, and said second subsystem comprising a second antenna and a second APM, each mounted on said vehicle, and a second ground-based RF beacon, said operating comprising:

storing an accumulated record of actuations of the second APM as a function of time, said accumulated record denoting normal operation of the second antenna, the second APM, and the second ground-based RF beacon, calculating a desired antenna tracking profile for the second antenna, during occurrence of an outage of the second ground-based RF beacon, by combining real-time information received from the first RF autotracked antenna subsystem with at least a portion of the historical data, and transmitting actuation commands to the second APM so as to cause the second antenna to track the desired antenna tracking profile.

4. The system of claim 1, wherein the real-time information received from the first RF autotracked subsystem comprises a real time stepping profile.

5. The system of claim 1, wherein the vehicle is a spacecraft and the controller is located on-board the spacecraft.

6. The system of claim 1, wherein the vehicle is a spacecraft and the controller is ground-based.

7. The apparatus of claim 2, wherein the real-time information received from the first RF autotracked subsystem comprises a real time stepping profile.

8. The system of claim 2, wherein the vehicle is a spacecraft and the controller is located on-board the spacecraft.

9. The system of claim 2, wherein the vehicle is a spacecraft and the controller is ground-based.

10. The method of claim 3, wherein the real-time information received from the first RF autotracked subsystem comprises a real time stepping profile.

11. The system of claim 3, wherein the vehicle is a spacecraft and the controller is located on-board the spacecraft.

12. The system of claim 3, wherein the vehicle is a spacecraft and the controller is ground-based.

* * * * *